United States Patent Office 2,862,170
Patented Nov. 25, 1958

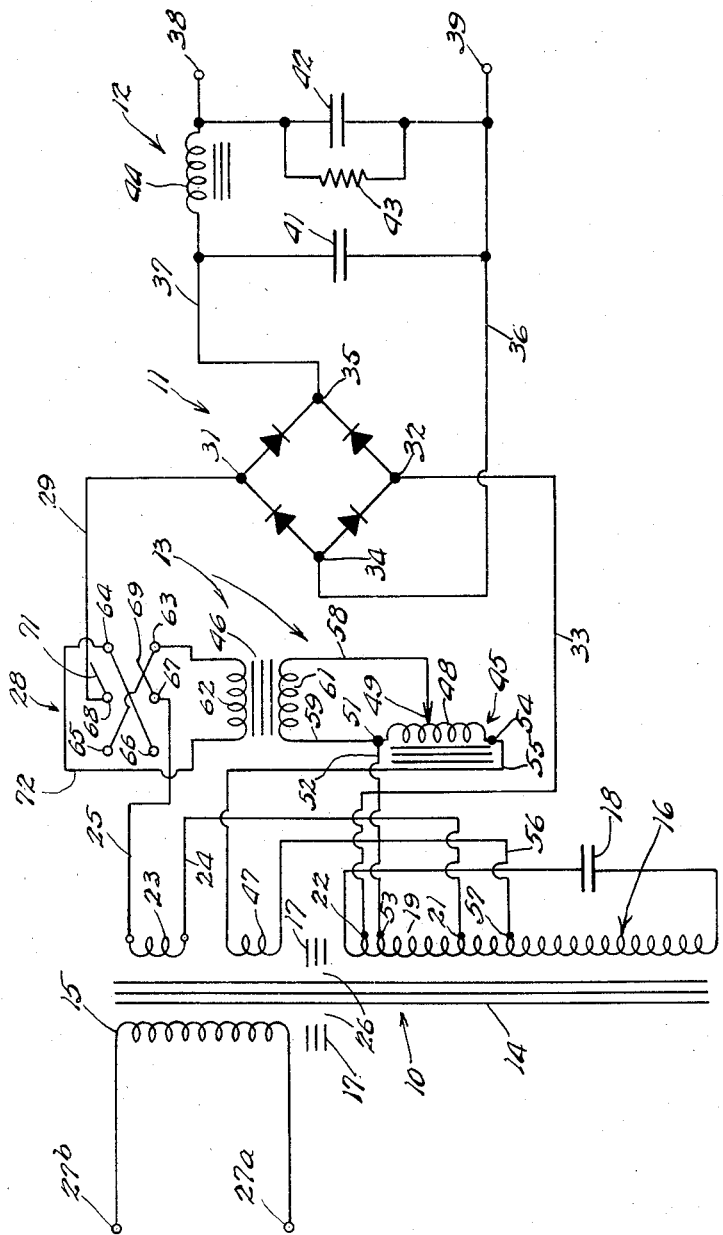

2,862,170

VARIABLE POWER SUPPLY APPARATUS

Hans U. Hjermstad, Chicago, Ill., assignor, by mesne assignments, to Basic Products Corporation, Milwaukee, Wis., a corporation of Wisconsin Application November 23, 1956, Serial No. 624,070

7 Claims. (Cl. 321—16)

This invention relates to variable power supply apparatus for operation from an A. C. source of predetermined voltage and frequency, and more particularly to such apparatus producing a variable D. C. power supply, and it is an object of this invention to provide improved apparatus of this character.

Power supply apparatus, more particularly D. C. power supply apparatus of the general type here under consideration, has been disclosed and claimed in the copending application of the same inventor, Serial No. 538,102, filed October 3, 1955, now Patent No. 2,804,588, entitled "Power Supply Apparatus" and assigned to the same assignee as the subject invention.

Such prior disclosed power supply apparatus has provided for apparatus producing a constant D. C. voltage irrespective of variations in the supply line voltage, or in the load. It is a further object of the invention to provide, in combination with such power supply apparatus, structure whereby a variable output of voltage may be obtained; that is to say, the output voltage may be varied to some desired value and, after such a value is selected, the output voltage remains constant, irrespective of load or supply line variations over rated ranges of these variables.

It is a further object of the invention to provide improved apparatus of the character indicated which is relatively simple in form, efficient in operation, and of reduced size and weight.

Additional objects of the invention will be apparent as the description provides, and the invention may be better understood by reference to the accompanying drawing, in which the single figure is a circuit diagram of apparatus according to the invention.

Referring to the drawing, the invention is shown as comprising a constant voltage transformer apparatus 10, rectifier apparatus 11, combined filter and transient load supply apparatus 12, and apparatus 13 connected between the constant voltage transformer 10 and the rectifier apparatus 11 for producing the desired variability of the output or load voltage according to the invention.

The constant voltage transformer apparatus 10, the rectifier apparatus 11, and the combined filter and transient load supply apparatus 12 are disclosed essentially in the above-referred-to application Serial No. 538,102, and function as described therein.

The constant voltage transformer apparatus 10, shown schematically, is of the resonant type disclosed and claimed in the patent to Joseph G. Sola No. 2,143,745, dated January 10, 1939, and comprises a high reactance transformer having a core 14, primary and secondary windings 15 and 16, respectively, disposed on core 14, a high reluctance magnetic shunt 17 magnetically disposed between the primary and secondary windings, and a capacitor 18 connected across the secondary winding 16. The portion 19 of the secondary winding between the taps 21 and 22 forms a load winding, the number of turns thereof being selected to provide the output voltage desired in connection with the remaining apparatus. The number of turns in the secondary winding 16 is chosen to provide, in combination with the capacitor 18, the desired flux density in the secondary portion of the core 14 while at the same time utilizing an economical size of capacitor. A compensating winding 23 is closely coupled to the primary winding 15 on the core and is connected to the tap 21 by means of a conductor 24 and to the rectifier apparatus by means of a conductor 25 and as will be described, the compensating winding being wound in such a direction as to oppose voltage increases when the primary voltage increases. The high reluctance shunt 17 may include nonmagnetic or air gaps 26 as is well understood and is the manner illustrated for obtaining high reactance in the transformer.

The size and number of laminations in the core 14 are selected in accordance with well-understood principles to provide the desired rating of transformer.

The capacitor 18 is chosen in accordance with the principles disclosed in the Sola Patent No. 2,143,745 hereinbefore referred to and has a capacitive reactance at the frequency and voltage of the source of A. C. supply connected to terminals 27a and 27b of the primary winding 15, bearing such a relationship to the inductive reactance of the transformer and particularly of the secondary winding 16 as to create a condition of substantially series resonance in the circuit of the secondary winding 16 and the capacitor 18 when the device is in operation. During such operation, because of the resonant effect, the voltage across capacitor 18—that is, the voltage across the secondary winding 16—is substantially greater than the turns ratio voltage. As a result, the flux density in the portion of the core 14 underneath the secondary winding 16 is very high and may approximate flux densities of the order of 120,000 lines per square inch while the corresponding flux density in that portion of the core 14 under the primary winding 15 may approximate 90,000 lines per square inch.

By virtue of the effects taking place in the transformer 10, a substantially constant A. C. output voltage is obtained across the taps 21 and 22 of the load winding 19, irrespective of substantial changes in the voltage across the input terminals 27a and 27b. This constancy of output voltage occurring in the circuit of the transformer disclosed, including the capacitor 18 connected across the secondary winding and as more fully disclosed in Patent No. 2,143,745 referred to, is defined, for purposes of this invention, as a substantially series resonant condition, that is, a condition of high flux density or saturation in the secondary portion of the core brought about by the combination of transformer 10 with capacitor 18. Such slight variations as occur in the constancy of the output of A. C. voltage may be corrected by the compensating winding 13. In the event that relatively slight changes in output voltages can be tolerated, the number of turns in the compensating winding may be reduced, or it may be eliminated completely.

The voltage varying apparatus 13 includes a reversing switch 28 which is connected between the conductor 25 leading from the compensating winding 23 and conductor 29 leading to one terminal 31 of the rectifier apparatus 11, the other input terminal 32 thereof being connected by means of conductor 33 to the tap 22. The output terminals 34 and 35 of the rectifier apparatus 11 are connected, respectively, by means of conductors 36 and 37, to the combined filter and transient load supply apparatus 12, which apparatus, in turn, is provided with terminals 38 and 39 to which the external load to be supplied is connectible.

As indicated in application Serial No. 538,102, the components of the rectifier apparatus 11 should be of very low internal resistance while having, at the same time, the ability to withstand a high peak inverse voltage, one form of rectifier unit producing satisfactory results being made of germanium. Likewise, as disclosed in the application referred to, the capacitors 41 and 42 of the combined filter and transient load supply apparatus 12 should be of very high capacity values so as to reduce to a negligible value the amount of ripple in the D. C. output voltage available at terminals 38 and 39, while at the same time the capacitors have a capacity value such as to be able to supply a transient load of substantial magnitude without affecting the output voltage.

It has been found that when capacitors 41 and 42 have a capacity magnitude such that a substantially square wave input of A. C. voltage is obtainable at terminals 31 and 32 of the rectifier apparatus 11, satisfactory results are obtained. A square wave is defined as one having a peak to R. M. S. ratio between 1 and a value not substantially greater than 1.15. The capacity value of capacitors 41 and 42 may vary with the power rating of the device, as well as the output voltage rating and in forms of apparatus as have been constructed, such capacity values have included the range from 1,000 to 8,000 mfds. for each capacitor. Other magnitudes of capacity are, of course, possible within the spirit and scope of the invention. A resistor 43 is shown, connected across the capacitor 42 in order to provide a bleeding circuit to remove the capacitor charge when the device is not in operation. In instances where a higher degree of filtering is necessary, a small choke 44 may be connected between capacitors 41 and 42, such chokes being of very low resistance values in order not to disturb the regulation of D. C. voltage desired.

Large transient charging currents to capacitors 41 and 42 from load winding 19 through the rectifier apparatus 11 are prevented by the high reactance of the transformer brought about by the shunt 17, including the air gap 26. The air gap may be chosen to limit such charging current to a desired value.

The circuit extending from the output winding portion 19 of the secondary winding to terminals 38 and 39 may now be traced as follows: From tap 21, through conductor 24, compensating winding 23, conductor 25, reversing switch 28, conductor 29, terminals 31 and 35 of rectifier apparatus 11, conductor 37, and choke 44 to terminal 38, and from tap 22 of winding portion 19 through conductor 33, terminals 32 and 34 of the rectifier apparatus 11, and conductor 36 to terminal 39.

The voltage varying apparatus 13, in addition to the reversing switch 28, comprises a variable voltage transformer 45, a fixed ratio transformer 46, and a compensating winding 47. The variable voltage transformer 45 may comprise any well-known type of variable transformer, the one illustrated including a winding 48, wound on an iron core, and a tap 49 movable along the winding so as to produce an output voltage of whatever desired proportion of the input voltage. One terminal 51 of winding 45 is connected by means of a conductor 52 to tap 53 on secondary winding 16, and the other terminal 54 of winding 48 is connected by means of a conductor 55 to one end of the compensating winding 47, the other end of which is connected by means of a conductor 56 to tap 57 on the winding 16.

The winding 48 of the variable transformer 45 is excited through the circuits just traced, the taps 53 and 57 being selected to correspond with voltages needed by the winding 48, and the compensating winding 47 being selected so as to reduce to a minimum any voltage variations which are produced as a result of variations in voltage at the input terminals 27a and 27b. The compensating winding 47 is closely coupled to the primary winding 15 in a manner similar to compensating winding 23. It has been found that improved results are obtained in the apparatus according to the invention when a separate compensating winding 47 is used instead of having compensating winding 23 perform two functions.

The output of the variable transformer 45 taken at tap 49 and terminal 51 is supplied through conductors 58 and 59 to the input winding 61 of fixed ratio transformer 46, the secondary winding 62 of which is connected to terminals 63 and 64 of the reversing switch 28. The transformer 46 should be selected such that the impedance drop in the secondary winding 62, including the resistance drop, is very low so as not to affect the desired output voltage regulation. The output voltage of winding 62 may be small in many applications in order to produce the desired variability of output voltage since, and as will become apparent, the voltage of winding 62 may be added to or subtracted from the A. C. output voltage which is supplied to the rectifier apparatus 11. In such applications, relatively high currents may be drawn, thereby accentuating the need for having low impedance in the winding 62. The reversing switch 28 also includes terminals 65 and 66 connected, respectively, by means of conductors shown to terminals 63 and 64, and terminals 67 and 68 connected to switch arms 69 and 71.

The operation of the apparatus may now be further explained. It is assumed that the device is in operation and that with a supply line voltage at terminals 27a and 27b of 115 volts but variable within the range from 100 to 130 volts is producing an output voltage at terminals 38 and 39 of 60 volts D. C. The variable voltage apparatus 13 including the reversing switch 28 may add or subtract 30 volts to the output voltage, thereby making it variable to any voltage within the range of 30 to 90 volts in the particular case described. It is also assumed that the switch arms 69 and 71 are in contact with the terminals 63 and 64, respectively, and that with this connection the variable voltage is adding to the center voltage of 60 volts. For this condition the circuit of the device may be traced from one side of the compensating winding 23 through conductor 25, terminal 67, switch arm 69, terminal 63, winding 62, conductor 72, terminal 64, switch arm 71, terminal 68 and conductor 29 to terminal 31 of the rectifier apparatus 11, and from the other side of the compensating winding to terminal 32 of the rectifier apparatus through a circuit already described. Under the assumed condition, the tap 49 of variable transformer 45 may be moved to tap off a voltage from zero to 30 volts which will add to the center output voltage of 60 volts to provide an output voltage varying between 60 and 90 volts at terminals 38 and 39. In a second condition of operation, it is assumed that the switch arms 69 and 71 are placed into engagement with the terminals 66 and 65, respectively, of the reversing switch. Under this condition the output circuit may be traced from one side of compensating winding 23 through conductor 25, terminal 67, switch arm 69, terminal 66, terminal 64, conductor 72, winding 62, terminal 63, terminal 65, switch arm 71, terminal 68 and conductor 29 to terminal 31 of the rectifier apparatus. The circuit from the other side of compensating winding 23 to terminal 32 of the rectifier apparatus is the same as for the previously assumed condition of operation. It will be noted that the circuit through winding 62 under this assumed condition of operation is in reverse to that under the condition of operation previously assumed. Accordingly, the voltage placed into the circuit by the voltage-varying apparatus subtracts from the output voltage and, by means of the tap 49 on the variable transformer 45, the amount of voltage subtracted may vary between zero and 30, thereby providing an output voltage at terminals 38 and 39 which may vary from 60 down to 30 volts.

While a particular embodiment of the invention has been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. D. C. power supply apparatus for operation from a source of predetermined voltage and frequency comprising a high reactance transformer having a core, a primary winding and a secondary winding disposed on said core and a high reluctance magnetic shunt magnetically disposed between said primary and secondary windings, said shunt including a nonmagnetic gap, a first capacitor connected across substantially said secondary winding, the value of capacitance of said capacitor at the voltage and frequency of such source having such a relationship to the reactance of said transformer at the same voltage and frequency as to create a substantially series resonant condition in the circuit of said transformer and capacitor during operation, at least a portion of said secondary winding forming a load winding, rectifier means of low internal resistance having input terminals connected to said load winding and having output terminals, a second capacitor of high capacity value connected across said output terminals, said nonmagnetic gap having a value such that said transformer provides a reactance for limiting the charging current of said load winding to said second capacitor, the capacity value of said second capacitor being such that the input voltage to said rectifier means becomes a substantially square wave, a variable source of voltage connected to be excited from said secondary winding and connected between said load winding and said rectifier means, and load terminals connected to the terminals of said second capacitor.

2. D. C. power supply apparatus for operation from a source of predetermined voltage and frequency comprising a high reactance transformer having a core, a primary winding and a secondary winding disposed on said core and a high reluctance magnetic shunt magnetically disposed between said primary and secondary windings, said shunt including a nonmagnetic gap, a first capacitor connected across substantially said secondary winding, the value of capacitance of said capacitor at the voltage and frequency of such source having such a relationship to the reactance of said transformer at the same voltage and frequency as to create a substantially series resonant condition in the circuit of said transformer and capacitor during operation, at least a portion of said secondary winding forming a load winding, rectifier means of low internal resistance having input terminals connected to said load winding and having output terminals, a second capacitor of high capacity value connected across said output terminals, said nonmagnetic gap having a value such that said transformer provides a reactance for limiting the charging current of said load winding to said second capacitor, the capacity value of said second capacitor being such that the input voltage to said rectifier means becomes a substantially square wave, a compensating winding closely coupled to said primary winding and connected in circuit with said load winding, a variable transformer having its input connected to be excited from said secondary winding, a further transformer having an input winding and an output winding, said input winding being connected to the output of said variable transformer and said output winding being connected between said load winding and said rectifier means, the output winding of said further transformer being of low resistance, and load terminals connected to the terminals of said second capacitor.

3. D. C. power supply apparatus for operation from a source of predetermined voltage and frequency comprising a high reactance transformer having a core, a primary winding and a secondary winding disposed on said core and a high reluctance magnetic shunt magnetically disposed between said primary and secondary windings, said shunt including a nonmagnetic gap, a first capacitor connected across substantially said secondary winding, the value of capacitance of said capacitor at the voltage and frequency of such source having such a relationship to the reactance of said transformer at the same voltage and frequency as to create a substantially series resonant condition in the circuit of said transformer and capacitor during operation, at least a portion of said secondary winding forming a load winding, rectifier means of low internal resistance having input terminals connected to said load winding and having output terminals, a second capacitor of high capacity value connected across said output terminals, said nonmagnetic gap having a value such that said transformer provides a reactance for limiting the charging current of said load winding to said second capacitor, the capacity value of said second capacitor being such that the input voltage to said rectifier means becomes a substantially square wave, a first compensating winding closely coupled to said primary winding and connected in circuit with said load winding, a variable source of voltage connected to be excited from said secondary winding and connected between said load winding and said rectifier means, a second compensating winding closely coupled to said primary winding and connected in the exciting connection of said variable source, and load terminals connected to the terminals of said second capacitor.

4. D. C. power supply apparatus for operation from a source of predetermined voltage and frequency comprising a high reactance transformer having a core, a primary winding and a secondary winding disposed on said core and a high reluctance magnetic shunt magnetically disposed between said primary and secondary windings, said shunt including a nonmagnetic gap, a first capacitor connected across substantially said secondary winding, the value of capacitance of said capacitor at the voltage and frequency of such source having such a relationship to the reactance of said transformer at the same voltage and frequency as to create a substantially series resonant condition in the circuit of said transformer and capacitor during operation, at least a portion of said secondary winding forming a load winding, rectifier means of low internal resistance having input terminals connected to said load winding and having output terminals, a second capacitor of high capacity value connected across said output terminals, said nonmagnetic gap having a value such that said transformer provides a reactance for limiting the charging current of said load winding to said second capacitor, the capacity value of said second capacitor being such that the input voltage to said rectifier means becomes a substantially square wave, a first compensating winding closely coupled to said primary winding and connected in circuit with said load winding, a variable transformer having its input connected to be excited from said secondary winding and its output connected between said load winding and said rectifier means, a second compensating winding closely coupled to said primary winding and connected into the input of said variable transformer, and load terminals connected to the terminals of said second capacitor.

5. D. C. power supply apparatus for operation from a source of predetermined voltage and frequency comprising a high reactance transformer having a core, a primary winding and a secondary winding disposed on said core and a high reluctance magnetic shunt magnetically disposed between said primary and secondary windings, said shunt including a nonmagnetic gap, a first capacitor connected across substantially said secondary winding, the value of capacitance of said capacitor at the voltage and frequency of such source having such a relationship to the reactance of said transformer at the same voltage and frequency as to create a substantially series resonant condition in the circuit of said transformer and capacitor during operation, at least a portion of said secondary winding forming a load winding, rectifier means of low internal resistance having input terminals connected to said load winding and having output terminals, a second capacitor of high capacity value connected across said output terminals, said nonmagnetic gap having a value such that said transformer provides a reactance for limiting the charging current of said load winding to said second capacitor, the capacity value of said second capacitor being such that the input voltage to said rectifier means becomes a substantially square wave, a first compensating winding closely coupled to said primary winding and connected in circuit with said load winding, a variable transformer having its input connected to be excited from said secondary winding, a further transformer having an input winding and an output winding, said input winding being connected to the output of said variable transformer and said output winding being connected between said load winding and said rectifier means, the output winding of said further transformer being of low resistance, a second compensating winding closely coupled to said primary winding and connected into the input of said variable transformer, and load terminals connected to the terminals of said second capacitor.

6. D. C. power supply apparatus for operation from a source of predetermined voltage and frequency comprising a high reactance transformer having a core, a primary winding and a secondary winding disposed on said core and a high reluctance magnetic shunt magnetically disposed between said primary and secondary windings, said shunt including a nonmagnetic gap, a first capacitor connected across substantially said secondary winding, the value of capacitance of said capacitor at the voltage and frequency of such source having such a relationship to the reactance of said transformer at the same voltage and frequency as to create a substantially series resonant condition in the circuit of said transformer and capacitor during operation, at least a portion of said secondary winding forming a load winding, rectifier means of low internal resistance having input terminals connected to said load winding and having output terminals, a second capacitor of high capacity value connected across said output terminals, said nonmagnetic gap having a value such that said transformer provides a reactance for limiting the charging current of said load winding to said second capacitor, the capacity value of said second capacitor being such that the input voltage to said rectifier means becomes a substantially square wave, a first compensating winding closely coupled to said primary winding and connected in circuit with said load winding, a variable transformer having its input connected to be excited from said secondary winding, a further transformer having an input winding and an output winding, said input winding being connected to the output of said variable transformer and said output winding being of low resistance, a reversing switch, said further transformer having its output winding connected to the input of said reversing switch, the output of said reversing switch being connected between said load winding and said rectifier means, a second compensating winding closely coupled to said primary winding and connected into the input of said variable transformer, and load terminals connected to the terminals of said second capacitor.

7. D. C. power supply apparatus for operation from a source of predetermined voltage and frequency comprising a high reactance transformer having a core, a primary winding and a secondary winding disposed on said core, a first capacitor connected across substantially said secondary winding, the value of capacitance of said capacitor at the voltage and frequency of such source having such a relationship to the reactance of said transformer at the same voltage and frequency as to create a substantially series resonant condition in the circuit of said transformer and capacitor during operation, at least a portion of said secondary winding forming a load winding, rectifier means of low internal resistance having input terminals connected to said load winding and having output terminals, a second capacitor of high capacity value connected across said output terminals, said high reactance transformer providing a reactance for limiting the charging current of said load winding to said second capacitor, the capacity value of said second capacitor being such that the input voltage to said rectifier means becomes substantially a square wave, a compensating winding closely coupled to said primary winding and connected in circuit with said load winding, a variable source of voltage connected to be excited from said secondary winding and connected between said load winding and said rectifier means, and load terminals connected to the terminals of said second capacitor.

References Cited in the file of this patent

UNITED STATES PATENTS

| 1,939,319 | Reiche | Dec. 12, 1933 |
| 2,467,863 | Short | Apr. 19, 1949 |
| 2,671,196 | Owen | Mar. 2, 1954 |

FOREIGN PATENTS

| 1,017,154 | France | Dec. 3, 1952 |